Oct. 13, 1936.    H. E. MORTON    2,057,247
MECHANICAL COUNTERBALANCE
Filed May 20, 1935    2 Sheets-Sheet 1

INVENTOR.
Henry E. Morton,
BY
ATTORNEYS

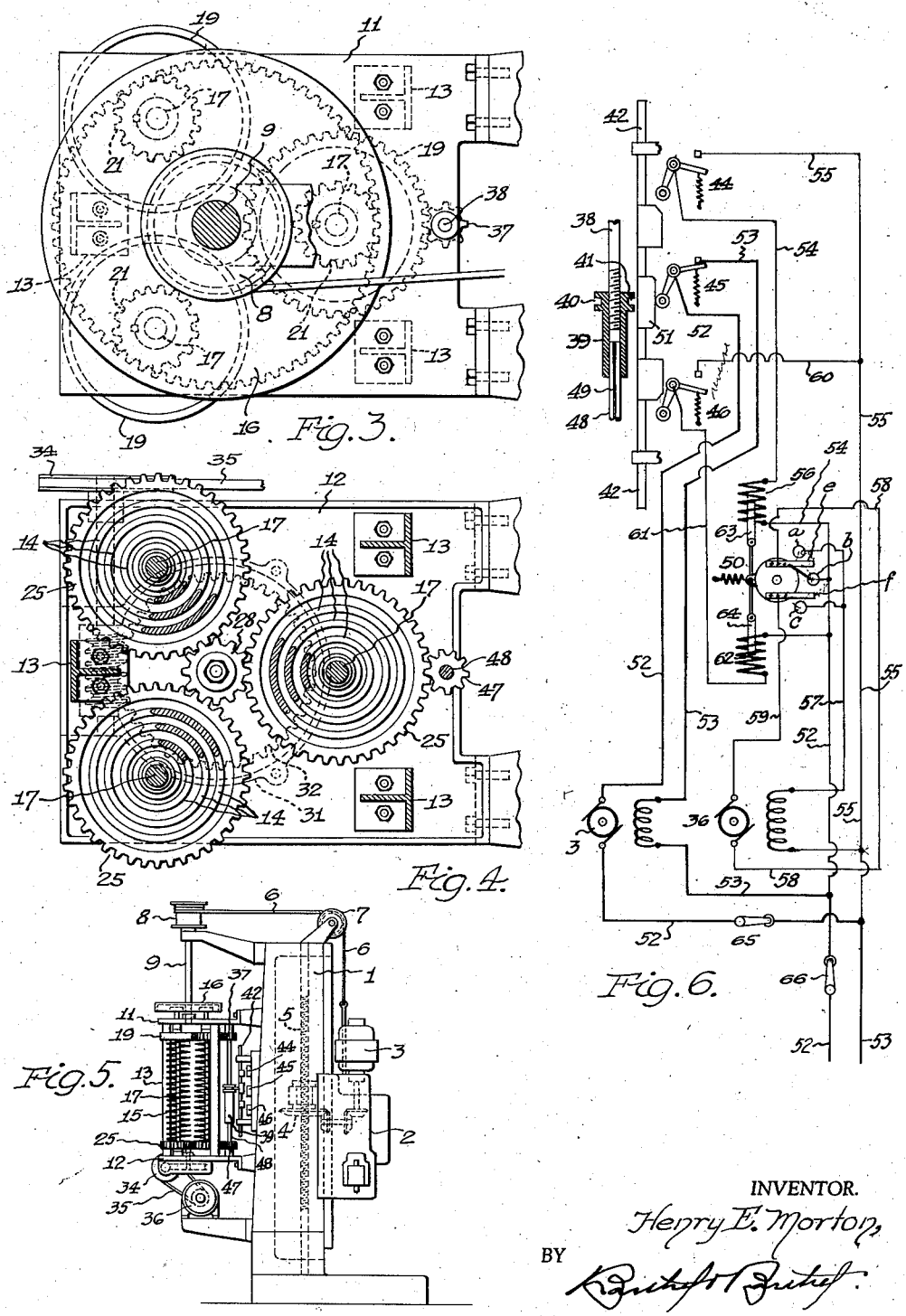

Patented Oct. 13, 1936

2,057,247

UNITED STATES PATENT OFFICE 2,057,247

MECHANICAL COUNTERBALANCE

Henry E. Morton, Muskegon Heights, Mich.

Application May 20, 1935, Serial No. 22,396

16 Claims. (Cl. 74—592)

This invention relates to a mechanically operated counterbalance, and more particularly to a device as distinguished from a solid weight, for counterbalancing a vertically movable load.

There are many applications in connection with mechanical installations, machines and devices where the installation of a solid counterbalancing weight is objectionable due to its bulk and weight, and the use of a spring or springs, per se for the purpose, is usually unsatisfactory, particularly in certain installations, due, principally, to variations in their balancing effect, throughout the range of movement of the load.

An object of the present invention is to provide a spring counterbalance wherein the same is automatically operative to maintain a substantially constant counterbalancing effect throughout the range of movement of the load in either direction, and to provide such a device which is particularly adapted for installation upon large metal working machines, especially those provided with a very heavy saddle or similar vertically movable part which, in order to prevent wear and to promote ease of operation, is preferably counterbalanced.

A further object is to provide a very compact unit for the purpose, which unit is light in weight as compared to that of a solid weight sufficient to give the same counterbalancing effect, and to provide such unit with counterbalancing springs and with means for maintaining said springs under a predetermined tension throughout the travel of the load counterbalanced thereby, to maintain the desired counterbalancing effect at all times, the same as is secured through the use of a solid weight.

It is also an object to provide a unit wherein simplicity and compactness of construction is secured through the employment of nested coiled springs, and the balancing effect of which springs is secured by placing the same under sufficient tension to substantially balance the load and by providing means for maintaining this tension during the travel of the load in either direction.

It is also an object to provide such means for maintaining normal spring tension, which means is automatic in its operation in tending to decrease spring tension as tension is applied by downward movement of the load, and in tending to increase such tension as the load is lifted; and further, to provide an arrangement whereby spring tension is maintained at all times, and a safety factor is provided by automatically discontinuing operation and the device and machine to which this device is applied, to prevent over-tensioning of said springs or injury to the machine, should some part of either, fail to function properly.

A further object is to provide a unit device for the purpose, which may be conveniently secured to any of the common forms of upright metal working machines having a vertically movable saddle or other part, and to which part said device may be connected in the usual manner of connecting a counterbalancing weight thereto, said device having certain other new and useful features in the construction, arrangement and combination of elements, all as hereinafter more fully described, reference being had to the accompanying drawings wherein:

Fig. 3 is a plan view of the upper end of Figure 1;

Fig. 4 is a horizontal section, substantially upon the line 4—4 of Figure 1;

Fig. 5 is a diagrammatic side elevation of a metal working machine, illustrative of the application thereto of the device embodying the invention; and Fig. 6 is a wiring diagram.

Figure 1:
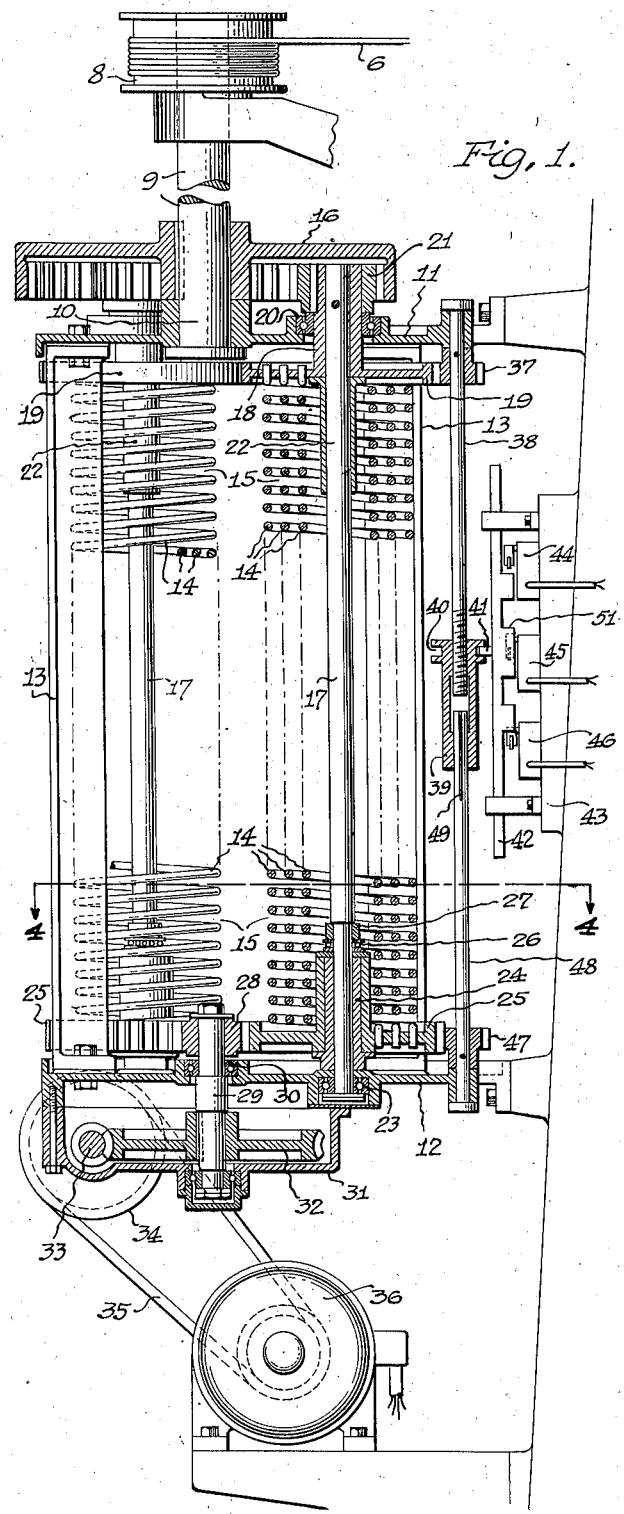
Figure 1 is a central, longitudinal, vertical section through a device illustrative of an embodiment of the invention.
Figure 2:
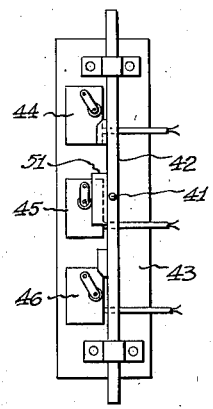
Fig. 2 is a detail illustrative of a form of switch mechanism.

The present counterbalancing unit may be used with various types and constructions of machines, but as illustrative of one application in use, a metal working machine of the vertical column type is shown in Fig. 5, said machine having a vertical column 1, one side face of which is provided with vertical ways for a vertically movable saddle 2 upon which is mounted an electric motor 3 from which motion is transmitted by any suitable gearing to rotate a suitable nut, indicated by the numeral 4 as carried by and movable with the saddle and mounted upon a vertical screw shaft 5 fixed within the column 1, so that upon energization of said motor, the saddle and parts carried thereby will be moved up or down upon said column depending upon the direction of rotation of said motor. Especially in large machines of this character where the saddle is very heavy and carries many of the working parts of the machine, the weight of the saddle is usually counterbalanced by means of a cable attached to the upper end of the saddle and extended over an idler 7 mounted upon the upper end of the column 1 and attached to a solid counterbalancing weight (not shown) slidable in ways on the column at the side thereof opposite the saddle, but such a counterbalancing weight is necessarily very heavy and adds greatly to the weight of the machine, this added weight being very undesirable, especially where the machine is designed to be moved from place to place in a shop or factory.

The unit embodying the present invention is adapted to be operatively connected by means of the cable 6, to the saddle or other vertically movable part of the machine to effect a counterbalancing thereof, but the unit is rigidly secured to the machine column in any suitable manner and the cable is wound upon a drum or pulley 8 fixed upon the upper end of a winding shaft 9 projecting from the unit and mounted for free rotation in a central bearing 10 on the head 11 of a suitable frame comprising said head, a lower end head 12 and a plurality of struts or bars 13 connecting said heads.

Mounted within this frame is a plurality of coiled springs 14 arranged in a plurality of nests 15, preferably arranged symmetrically about a central longitudinal axis which is an extension of the axis of the shaft 9 upon which shaft is splined above the frame head 11, an internal gear 16 of large diameter, and extending axially through each spring nest 15 is a shaft 17, each having a bearing at its upper end in the extended hub portion 18 of a disk-like member or head 19 located directly below the head 11 of the frame, each hub 18 in turn being mounted for free rotation within a ball bearing 20 on the frame head 11 and extended upwardly therethrough with a pinion 21 keyed to the upper end of each hub within the large internal gear 16 and in mesh therewith, each shaft 17 being pinned or otherwise secured at its upper end within the hub 18 of a disk or head 19 to turn therewith. To provide a further bearing for the upper end of each shaft 17, a sleeve 22 is mounted on each shaft to extend downwardly from the disk-like head 19 thereon with its upper end secured to or formed integral with said head; and at its extreme lower end each shaft 17 is mounted within a ball bearing 23 on the lower head 12 of the frame, and the lower end portion of each of said shafts is reduced in diameter to extend through a bushing 24 for the upwardly extended hub of a large gear 25, each of which gears is larger in diameter, than the external diameter of each nest of springs, each gear being free to turn upon its bushing which rests at its lower end upon the frame head 12, and each shaft 17 being free to turn within each bushing, a thrust bearing 26 being interposed between the upper end of each bushing and a collar 27 on the shaft.

Each nest 15 of springs as shown, consists of three coiled springs 14 arranged, one within the other, and one of the shafts 17 extends axially through each nest with the individual springs of each nest secured at their upper ends to the heads or disks 19 and their lower ends to the gears 25, these nests of springs thus connecting said disks and gears so that by relative rotation thereof, said springs may be put under tension, and to so rotate said gears relative to said disks while said disks are held against rotation through the engagement of each pinion 21 with the large internal gear 16 which is in turn held against rotation by the cable 6 connected to the load and wound about the drum 8 fixed on the shaft 9 to which said gear is secured, the said gears 25 are all engaged by a central pinion 28 secured upon the upper end of a stub shaft 29 mounted in a bearing 30 on the lower head 12 of the supporting frame and extending downwardly therethrough into a casing 31 secured to said head and within which casing is a worm wheel 32 secured upon said stub shaft and engaged by a worm on a shaft 33 mounted in said casing and projecting therefrom with its projecting end provided with a pulley 34 engaged by a belt 35 for transmitting motion from an electric motor 36 to said worm shaft.

Therefore with the upper ends of the nests of springs held against rotation, and by starting the motor 36 to drive the central pinion 28 and through it, the gears 25 in the proper direction, the springs of each nest will be wound up or put under tension, which winding will be continued until the springs have been put under sufficient initial tension to substantially counterbalance the weight of the saddle; such spring tension tending to rotate the disks 19 and through the pinions 21, internal gear 16 and shaft 9, tending to rotate the drum 8, which rotation tends to wind the cable 6 thereon, creating a pull on said cable equal in effect to a counterbalancing weight if suspended by said cable. It is, of course, essential that this initial tension be maintained throughout the range of movements of the saddle, to give the same balancing effect that a weight would have.

Ordinarily, an upward movement of the saddle or load would, through a slackening of the cable, permit the internal gear and disks 19 to which the springs are attached, to turn and the springs to unwind, thus decreasing their initial tension, and therefore means hereinafter described is provided for automatically starting the motor 36 and winding the springs, through the medium of the gears 25 to which the lower ends of the springs are attached, to re-establish the initial tension soon after they are permitted to unwind by the slackening of the cable. In like manner, when the saddle or load descends, it creates a pull upon the cable, which pull rotates the drum 8, the internal gear 16, and through the medium of the pinions 21, the disks or heads 19 to which the upper ends of the springs are attached, thus tending to wind up or place said springs under further tension, increasing their initial tension, this providing the gears 25 and therefore the lower ends of the springs are at this time held against rotation; but to counteract this tensioning effect, the motor 36 is automatically started by means hereinafter described, to rotate in a reverse direction or in a direction to rotate the gears 25 in a direction to unwind said springs, and therefore when the springs are wound by the pull of the cable 6, they are unwound by the motor, and the initial tension of the springs is therefore maintained substantially throughout the range of movement of the load, giving the desired balancing effect at substantially all times.

In order to automatically control the starting of the motor 36 to wind the springs as unwinding takes place due to the slackening of the cable upon upward movement of the saddle or load, one of the disks or heads 19 is formed with peripheral teeth to engage a pinion 37 secured upon a shaft 38 which is mounted at its upper end for free rotation within a bearing formed on one side of the head 11 of the supporting frame of the device, this shaft extending downwardly parallel with the frame and screw-threaded at its lower end to engage the screw-threaded bore in one end of a traveling nut or sleeve 39 having a peripheral groove 40 to be engaged by a lug 41 on a longitudinally shiftable bar or slide 42 mounted in bearings on a supporting bracket 43 secured to the adjacent side of the column 1 and which bracket forms a support for a series of electric switches 44, 45, and 46, said shifting bar or slide 42 being provided with cam lugs or projections, one for each switch to engage and operate the same upon shifting of said slide, said switches being of any suitable construction, each connected within an electric circuit to function as hereinafter described.

When the disk heads 19 are rotated by a pull on the cable 6, rotation will be imparted by the toothed disk, to the pinion 37 and shaft 38 and, due to the screwthreaded engagement of said shaft with the sleeve 39, said sleeve will be moved upwardly endwise of said shaft and carry the shiftable cam bar 42 with it, which movement will be comparatively quick due to the small diameter of the pinion 37 as compared with that of the toothed disk engaging it, and one of the cam projections on the bar will be quickly brought into engagement with the switch 44 to close the same and start the motor 36 for the purpose previously described. As soon as said motor starts, the gears 25 to which the lower ends of the springs are secured, will be rotated to decrease the spring tension as previously described and one of these gears will impart rotation to a pinion 47 which is in contact therewith and which is secured to a vertical shaft 48 mounted at its lower end in a bearing on the lower head 12 of the supporting frame in vertical alignment with the shaft 38 with its upper end slidable longitudinally within the bore of the lower end of the sleeve 39 and connected thereto to turn the same, by means of a spline 49. Therefore immediately upon the starting of the motor 36 by the throwing of the switch 44 the shaft 48 is rotated and through its splined engagement with the sleeve 39 turns said sleeve in a direction to move it downwardly on the shaft 38, thus moving the slide 42 downward and allowing the switch 44 to open, stopping the motor and bringing the parts to rest with the springs under normal tension.

When the saddle movement is reversed or is moved upwardly, the slackening of the cable thereby, permits the header disks 19 to rotate and this rotation imparts rotation to the shaft 38 in a direction to move the sleeve 39 and slide bar 42 downwardly to operate the switch 46 to start the motor 36 in a direction reverse to that in which it was started during the previously described or downward movement of the saddle, this reversing of said motor being effected by a reversing or control switch 50 indicated in Fig. 6; and the power of this reversed motor is applied in a manner to turn the gears 25 in a direction to wind the springs 14 attached thereto, and to turn, through the medium of the pinion 47, the shaft 48 in a direction to screw the sleeve 39 up on the shaft 38, moving said sleeve and shifting bar 42 in a direction opposite to that in which it was just previously moved before the motor started, and thus operating the switch 46 to stop the motor, the control switch 50 being moved thereby to neutral or off position as shown in Fig. 6.
When the bar 42 is in neutral or mid position as illustrated, the switch 45 which is connected in the main circuit of the prime mover or motor 3 for moving the saddle 2 up or down upon the machine pedestal or column 1, is held closed by the cam projection 51 on said bar, and this projection is of such a length longitudinally of the bar that it will continue to hold said switch 45 closed during the normal operation of the device, that is, throughout the normal travel of the bar 42 in either direction; but should any part of the device fail to function and a reversal of movement of said bar fail to take place at either end of its normal stroke, said bar will overrun its normal stroke and by so doing will move its cam 51 out of contact with said switch 45, thus permitting said switch to open and open the circuit of the motor 3, stopping the functioning of the entire machine, this device, thus providing a safety factor.

Figure 6 is illustrative of a suitable wiring diagram including said control or motor reversing switch 50 and means for operating the same, together with suitable circuits and connections illustrative of an arrangement adapted to function in accordance with the described operation. In said diagram 52 and 53 indicate the wires of the main or power circuit across which the power traverse motor 3 is connected with these wires connected to the terminal and switch arm of the switch 45. To the terminal and switch arm of the switch 44 are connected wires 54 and 55 of an auxiliary circuit, the wire 55 of which is direct connected to the wire 53 of the power circuit and the wire 54 of which is connected to the coil of a solenoid 56 for operating the control switch 50 in one direction, said switch 50 having three terminals, a, b, and c, adapted to be engaged by two separate contact arms e, f, carried by a rotative insulating body, the wire 54 being connected to the terminal b and then continued on to connection with the wire 52 of the power circuit. The terminals a and c are connected by the field winding of the motor 36 by a wire 57 and the arm e is connected by a wire 58 to one terminal of the motor 36 and the arm f by a wire 59 to the other terminal of said motor. The switch 46 is connected within a second auxiliary circuit by a wire 60 connecting its terminal to the wire 55 and its switch arm by a wire 61 to one end of the coil of a solenoid 62 with its opposite end of said coil connected to the wire 52 of the power circuit.

With this or a similar arrangement of circuits and motors and control switch therein, when the solenoid 56 is energized by the closing of the switch 44, the switch body to which the movable core 63 of said solenoid is connected, will be swung in one direction to bring its arms e, f into contact with the contacts b and c and energize the motor 36 for rotation in one direction. Upon the closing of the switch 46, the other solenoid 62 will be energized, swinging the switch body to which the core 64 of said solenoid is connected, to bring the arms of the switch into contact with the terminals a, b and energize the motor 36 to turn in an opposite direction. If found desirable hand operated switches indicated at 65 and 66 may be provided for opening the circuits, and it will be understood that the arrangement of circuits and construction of reversing switch as shown, is merely illustrative of an operative device and specifically forms no part of the present invention other than to show a device as a whole, adapted to operate as described. Other changes in the construction

What I claim is:—

1. A device for the purpose of counterbalancing an upwardly and downwardly movable load, said device including a yieldable member adapted to be put under torsional strain, torsion applying means connected to one end only of said member and to the load for applying torsional strain to said end of said member by movement of the load, and means connected to the opposite end of said member and adapted by means independent of the load and in timed relation to the movement of the load for substantially maintaining the torsion applied by the load and automatically placing said initially tensioned member under tension as tension thereof is decreased by upward movement of the load and automatically relieving the tension of said initially tensioned member as tension thereof is increased by downward movement of the load.

2. A device for the purpose described comprising a flexible member adapted to be placed under torsional strain to counterbalance an upwardly and downwardly movable load, rotative torsion applying means connecting one end of said member and the load for applying torsion to said end of said member by downward movement of the load, and means connected to the opposite end of said member to apply torsion thereto and operating in timed relation to the movement of the load and independently of application of torsion to said member by the load.

3. In a device for the purpose described, the combination of a spring member, rotative means connected to one end of said member and operatively connected to the load to be rotated thereby upon downward movement of the load to apply twisting strain to said end of said spring member, and torsion applying means connected to the opposite end of said spring member for putting the same under torsional strain, said last named means being operated independently of the load.

4. A unit structure for counterbalancing a part of a machine having an up and down movement, said unit including a coiled spring, torsion applying means connected to each end of said spring, means connecting said torsion applying means at one end of said spring to the load to be counterbalanced and operated thereby to apply torsion to that end of the spring by downward movement of the load, torsion applying means connected to the opposite end of said spring, and means for operating said last mentioned means in timed relation to the operation of said first named torsion applying means to apply torsion to said spring as the torsion thereof is relieved by the upward movement of the load.

5. A unit structure adapted to be secured to a stationary part of a machine having a part forming a load to be counterbalanced, said unit including a frame, a yieldable member carried by said frame, rotatable torsion applying means connected to one end only of said yieldable member and operatively connected to the load to apply torsion to said end of said member upon movement of the load in one direction and to release the same upon movement of the load in the opposite direction, torsion applying means connected to the opposite end of said member, and power means for operating said last named torsion applying means and operative to apply torsional strain to said end of said member upon release of torsional strain on said end of said member upon release of torsional strain thereon by upward movement of the load.

6. A device for the purpose described and as characterized in the previous claim, and including means operated by the torsioning and detorsioning operations effected by movements of the load, for automatically effecting the operation of said power means in torsioning and releasing the torsion of said yieldable member in timed relation to the release and creation of torsion by movement of the load.

7. A device for the purpose described including a coiled spring, torsion applying means connected to each end of said spring, means for rotating said torsion applying means at one end of said spring and connected to the load to be rotated by downward movement thereof and place the spring under torsion and to release the torsion upon upward movement of the load, and separate power means for rotating said torsion applying means connected to the opposite end of said spring in timed relation to the movements of the load and the application and release of torsion to said end of the spring.

8. A device for the purpose described including a coiled spring, means secured to one end of said spring for rotating the same to alternately torsion and release said spring, rotary means secured to the opposite end of said spring for effecting a torsioning and detorsioning movement of said spring by movement of a load counterbalanced by said spring, and means for effecting a torsioning movement of said first named means upon detorsioning movement of said second named means.

9. A device as characterized in claim 7, and including means for stopping and starting said power means in timed relation to the operation of said first named torsion applying means to which the load is connected.

10. In a counterbalancing device, the combination with an upwardly and a downwardly movable load to be counterbalanced; of a counterbalancing spring, rotative members to which the ends of said spring are secured, means for transmitting the motion of said load to rotate said member at one end of said spring, a power member to rotate said member at the other end of said spring, and means effective upon upward movement of the load, to start the power member and tension said spring and upon downward movement of the load, to start the power member to de-tension said spring.

11. In a counterbalancing device, the combination with an upwardly and downwardly movable load to be counterbalanced; of a counterbalancing coiled spring, means for tensioning said spring by the downward movement of the load and for relieving the tension of said spring upon upward movement of the load, separate tensioning means operative in timed relation to the operation of said first named tensioning means to relieve the tension of said spring when tensioned by downward movement of the load and for tensioning said spring when relieved by upward movement of the load.

12. A device as characterized in claim 11 and wherein said separate tensioning means includes a motor, and means for controlling the operation of said motor, which controlling means is operatively connected to both tensioning means.

13. A device as characterized in claim 11 and wherein said separate tensioning means includes a motor, and means for controlling the operation of said motor, which controlling means is operatively connected to both tensioning means, and includes a plurality of circuits, switches for said circuits, a shiftable member for operating said switches, a motor reversing switch, and means in said circuits for operating said reversing switch.

14. A counterbalancing unit including a supporting frame, a plurality of nests of coiled springs mounted on said frame, rotative members to which the ends of the springs of each nest are secured, means interconnecting said rotative members at each end of said nests for simultaneous rotation, means for actuating said inter-connecting means at one end of said nests, by movements of a load to be counterbalanced, a motor for driving said other of said inter-connecting means, and means operated by both of said inter-connecting means for controlling said motor.

15. A device as characterized in claim 14 and wherein said means for controlling said motor includes members each operatively connected to one of said inter-connecting means to be rotated thereby, shiftable means moved by one of said members in one direction and by the other member in an opposite direction, electric circuits, and switches in said circuits operated by the shifting of said shiftable means.

16. In a device of the character described, the combination with a structure having an upwardly and downwardly movable part to be counterbalanced; of a unit to be secured to a fixed part of said structure and comprising a supporting frame, a plurality of coiled springs arranged within said frame in a plurality of nests, a head for each nest and to which heads said springs are secured at one end, a shaft extending longitudinally of each nest and to which shafts said heads are secured, a pinion on the end of each shaft, a gear engaging all of said pinions to cause simultaneous rotation of said pinions and heads, means for rotating said gear in one direction by downward movement of the load, said springs being effective to rotate said gear in an opposite direction upon upward movement of the load, a gear to which the opposite end of each nest is secured, a motor for rotating said gears in both directions, means for controlling and reversing said motor, and means for operating said controlling means, operatively connected for operation by rotation of said heads to which one end of said springs is attached and by rotation of said gears to which the other ends of said springs are secured.

HENRY E. MORTON.